United States Patent
Saucier et al.

(10) Patent No.: US 11,958,524 B1
(45) Date of Patent: Apr. 16, 2024

(54) HANDLE ASSEMBLY FOR INFANT CARRIER AND STROLLER

(71) Applicant: Evenflo Company, Inc., Miamisburg, OH (US)

(72) Inventors: Shain A. Saucier, Charlotte, NC (US); Charles H. Keegan, Milton, MA (US); Meng Zhang, Suzhou (CN); Xiaoyong Yang, Suzhou (CN); Xiang Gao, Suzhou (CN); Wenlong Lv, Suzhou (CN); Bo Feng, Suzhou (CN)

(73) Assignee: Evenflo Company, Inc., Miamisburg, OH (US)

( * ) Notice: Subject to any disclaimer, the term of this patent is extended or adjusted under 35 U.S.C. 154(b) by 0 days.

(21) Appl. No.: 18/099,632

(22) Filed: Jan. 20, 2023

(51) Int. Cl.
*B62B 7/10* (2006.01)
*B62B 9/20* (2006.01)

(52) U.S. Cl.
CPC .............. *B62B 9/203* (2013.01); *B62B 7/105* (2013.01)

(58) Field of Classification Search
CPC ......... B60N 2/2848; B62B 7/12; B62B 7/105; A47D 13/02; A47D 13/025; A47D 13/027
USPC .......................................... 280/643, 648, 30
See application file for complete search history.

(56) References Cited

U.S. PATENT DOCUMENTS

| | | | | |
|---|---|---|---|---|
| 4,371,206 A | * | 2/1983 | Johnson, Jr. ........... | A47D 13/02 5/101 |
| 4,634,175 A | * | 1/1987 | Wise .................... | A47D 13/027 297/183.3 |
| 4,685,688 A | * | 8/1987 | Edwards .............. | B60N 2/2848 D6/333 |
| 4,872,693 A | * | 10/1989 | Kennel .................... | B62B 7/12 280/47.38 |
| 4,874,182 A | * | 10/1989 | Clark ....................... | B62B 7/12 280/47.38 |
| 4,878,680 A | * | 11/1989 | Molnar ..................... | B62B 7/12 280/30 |
| 4,902,026 A | * | 2/1990 | Maldonado .......... | B60N 2/2848 280/30 |
| 4,946,180 A | * | 8/1990 | Baer .................... | A47D 1/0081 280/47.38 |
| 4,986,599 A | * | 1/1991 | Wise ..................... | A47D 1/002 297/183.3 |
| 4,989,888 A | * | 2/1991 | Qureshi ................ | B60N 2/286 280/30 |
| 5,104,134 A | * | 4/1992 | Cone .................... | B60N 2/2863 280/30 |
| 5,143,419 A | * | 9/1992 | Tepper ................. | A47D 13/027 297/131 |
| 5,318,311 A | * | 6/1994 | Bofill ................... | B60N 2/2848 280/30 |
| 5,398,951 A | * | 3/1995 | Ryu ......................... | B62B 7/12 280/47.38 |

(Continued)

*Primary Examiner* — Jeffrey J Restifo
(74) *Attorney, Agent, or Firm* — Shook, Hardy & Bacon L.L.P.

(57) ABSTRACT

A handle assembly for an infant carrier is provided. The handle assembly allows the handle to be oriented in one of a plurality of positions, such as a stroller position, and infant carrier position and a car seat position. The handle assembly may include a locking mechanism allowing a handle extension to be extended only when the handle rotated to the stroller position. The handle assembly may also include a blocking mechanism that prevents the handle from rotating from the stroller position if the handle is extended.

16 Claims, 18 Drawing Sheets

(56) References Cited

U.S. PATENT DOCUMENTS

| | | | | |
|---|---|---|---|---|
| 5,403,022 A * | 4/1995 | Snider | B60N 2/2845 | D34/12 |
| 5,823,547 A * | 10/1998 | Otobe | B60N 2/2839 | 280/30 |
| 5,961,180 A * | 10/1999 | Greger | A47D 13/025 | 297/183.2 |
| 6,237,995 B1 * | 5/2001 | Dierickx | B60N 2/286 | 297/130 |
| 6,253,392 B1 * | 7/2001 | Conforti | A47K 3/024 | 4/572.1 |
| 6,296,259 B1 * | 10/2001 | Anderson | B62B 7/006 | 280/30 |
| 6,561,577 B2 * | 5/2003 | Kelly | A47D 13/02 | 297/183.2 |
| 6,910,696 B2 * | 6/2005 | Bargery | B60N 2/2845 | 280/30 |
| 7,506,921 B1 * | 3/2009 | Sigmon, Jr. | B60N 2/2848 | 280/30 |
| 7,540,507 B1 * | 6/2009 | Kennedy | B60N 2/2848 | 280/30 |
| 7,669,927 B1 * | 3/2010 | Zaid | A47D 9/057 | 297/260.2 |
| 8,998,242 B2 * | 4/2015 | Wang | B62B 7/12 | 280/30 |
| 9,168,940 B1 * | 10/2015 | Leszczak | A47D 1/00 | |
| 9,227,536 B1 * | 1/2016 | Cary | B62B 7/12 | |
| 9,371,017 B2 * | 6/2016 | Spence | B60N 2/2812 | |
| 10,035,437 B1 * | 7/2018 | Ballard | B60N 2/2842 | |
| 10,427,558 B1 * | 10/2019 | Dickens | B62B 7/006 | |
| 2002/0060444 A1 * | 5/2002 | Cote | B60N 2/2806 | 280/648 |
| 2003/0015894 A1 * | 1/2003 | Bargery | B60N 2/2848 | 297/118 |
| 2012/0119457 A1 * | 5/2012 | Williams | B62B 7/083 | 280/30 |
| 2013/0229033 A1 * | 9/2013 | Lee | B62B 7/12 | 297/130 |
| 2014/0265255 A1 * | 9/2014 | Wang | B60N 2/2806 | 280/643 |

* cited by examiner

HANDLE ASSEMBLY FOR INFANT CARRIER AND STROLLER

TECHNICAL FIELD

The present disclosure generally relates to a handle assembly for a convertible infant transport system.

BACKGROUND

Traditionally, infants may be transported in infant carriers, which may also be a part of an infant car seat or as a part of a stroller (among other modes of transport). There have been some attempts to develop systems that may be used as a car seat, an infant carrier and a stroller. As these systems transition between the various modes of transport, a handle assembly is needed that easily transitions to the various needed positions, and allows certain movements only when the handle is properly positioned.

BRIEF DESCRIPTION OF THE DRAWINGS

The drawings described herein are for illustrative purposes only, are schematic in nature, and are intended to be exemplary rather than to limit the scope of the disclosure.

DETAILED DESCRIPTION

In an example, a handle assembly is provided for an infant carrier and stroller. The handle assembly has a structure that ensures the handle can be positioned only as designed in the infant carrier (vertical) position, a rearwardly angled car seat position, and a forwardly angled stroller position. Additionally, the structure for the handle assembly allows a handle extension to extend only when the handle is rotated to the stroller orientation, but is prevented from extending in any other position. When in the stroller position, with the handle extended, the structure also prevents the handle assembly from rotating back to the vertical position, unless the handle is first returned to a retracted position.

The above features and advantages and other features and advantages of the present teachings are readily apparent from the following detailed description of the modes for carrying out the present teachings when taken in connection with the accompanying drawings.

Figure 1:
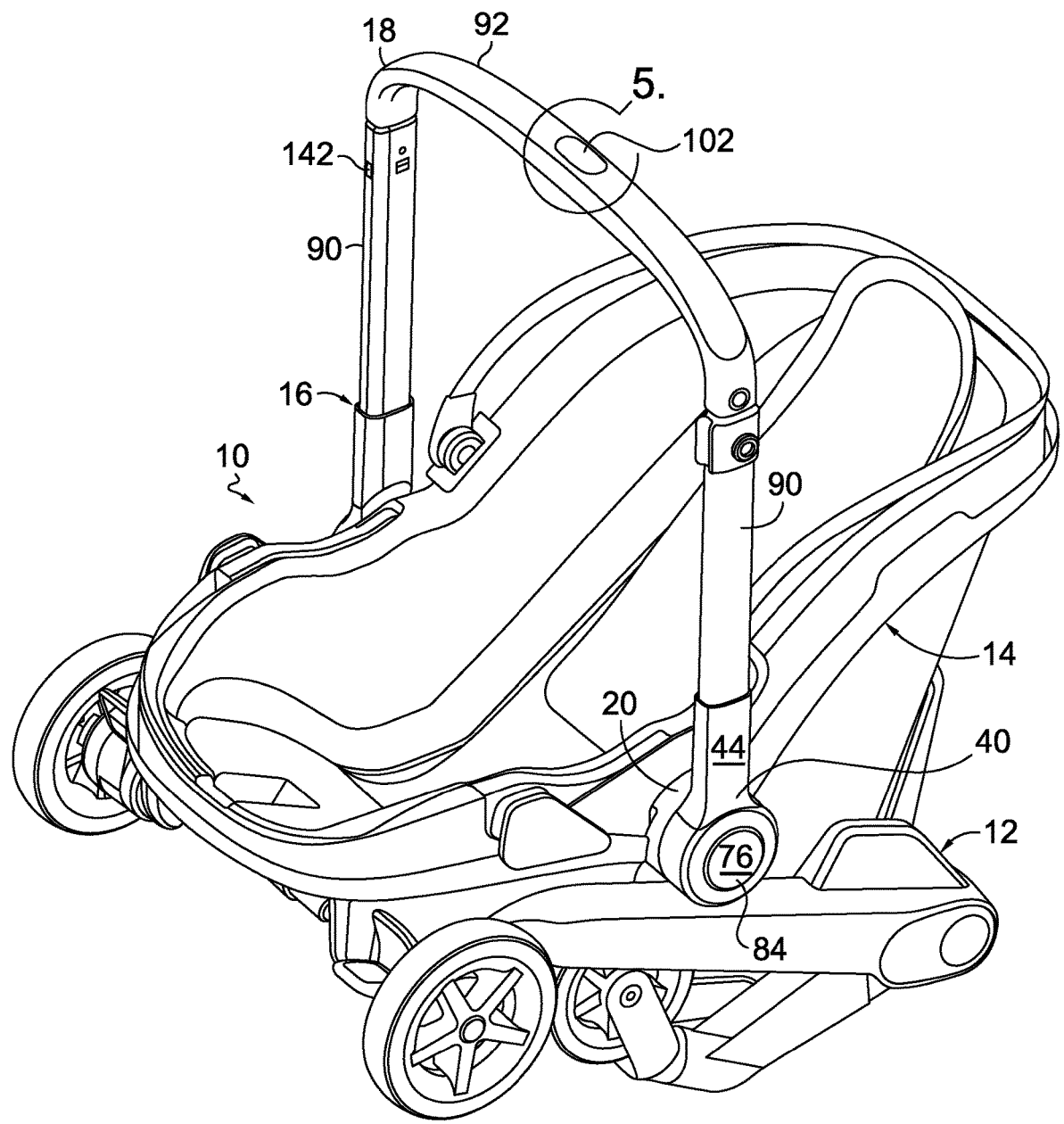
FIG. 1 is a perspective view of an infant transport assembly shown in an infant carrier mode with the handle assembly in a generally vertical orientation, in accordance with examples herein.
Figure 2:
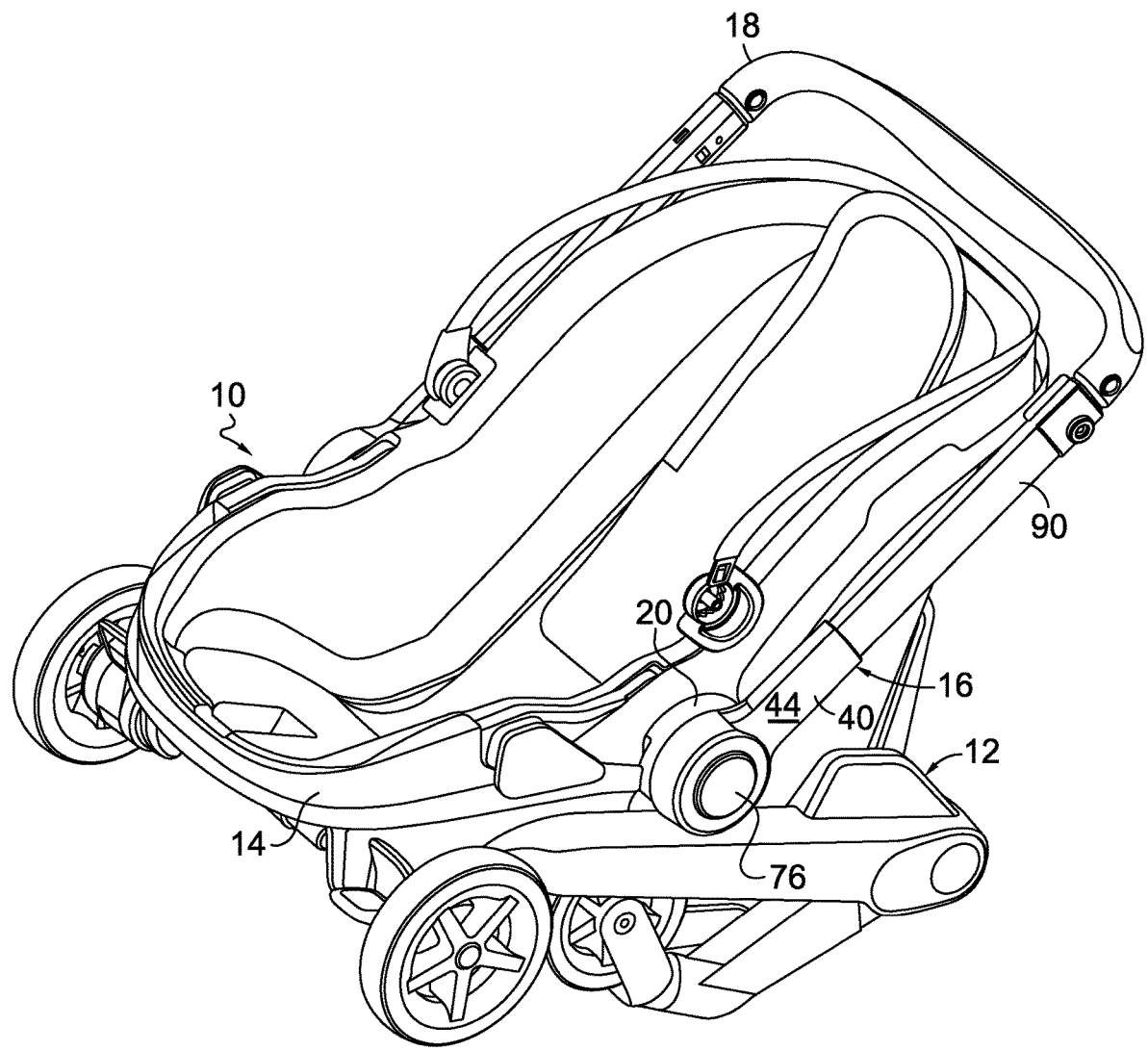
FIG. 2 is a perspective view similar to FIG. 1, but showing a car seat mode, with the handle assembly rotated toward the head end of the shell, in accordance with examples herein.
Figure 3:
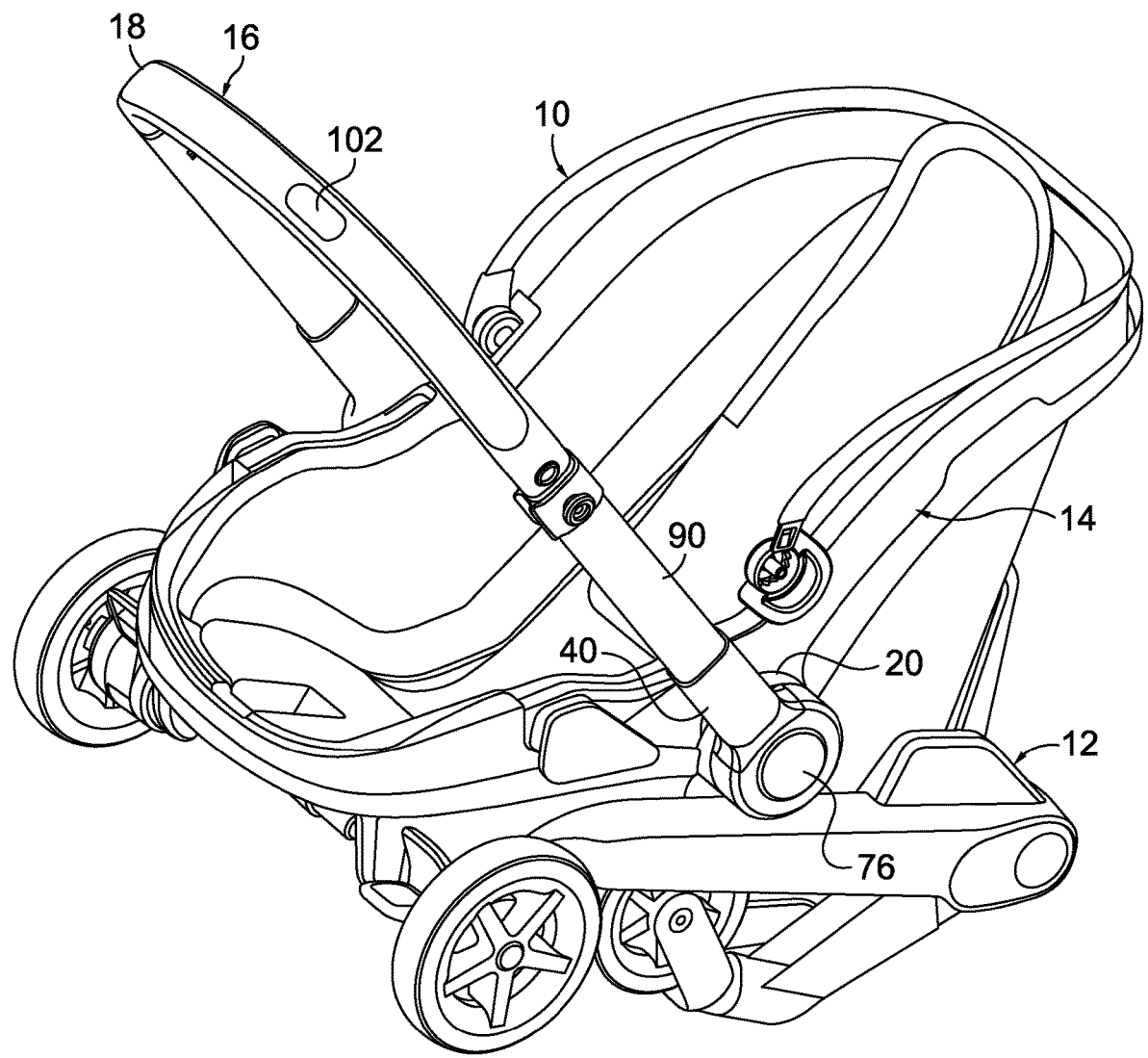
FIG. 3 is a perspective view similar to FIG. 1, but showing the handle assembly rotated toward the toe end of the shell, in accordance with examples herein.
Figure 4:
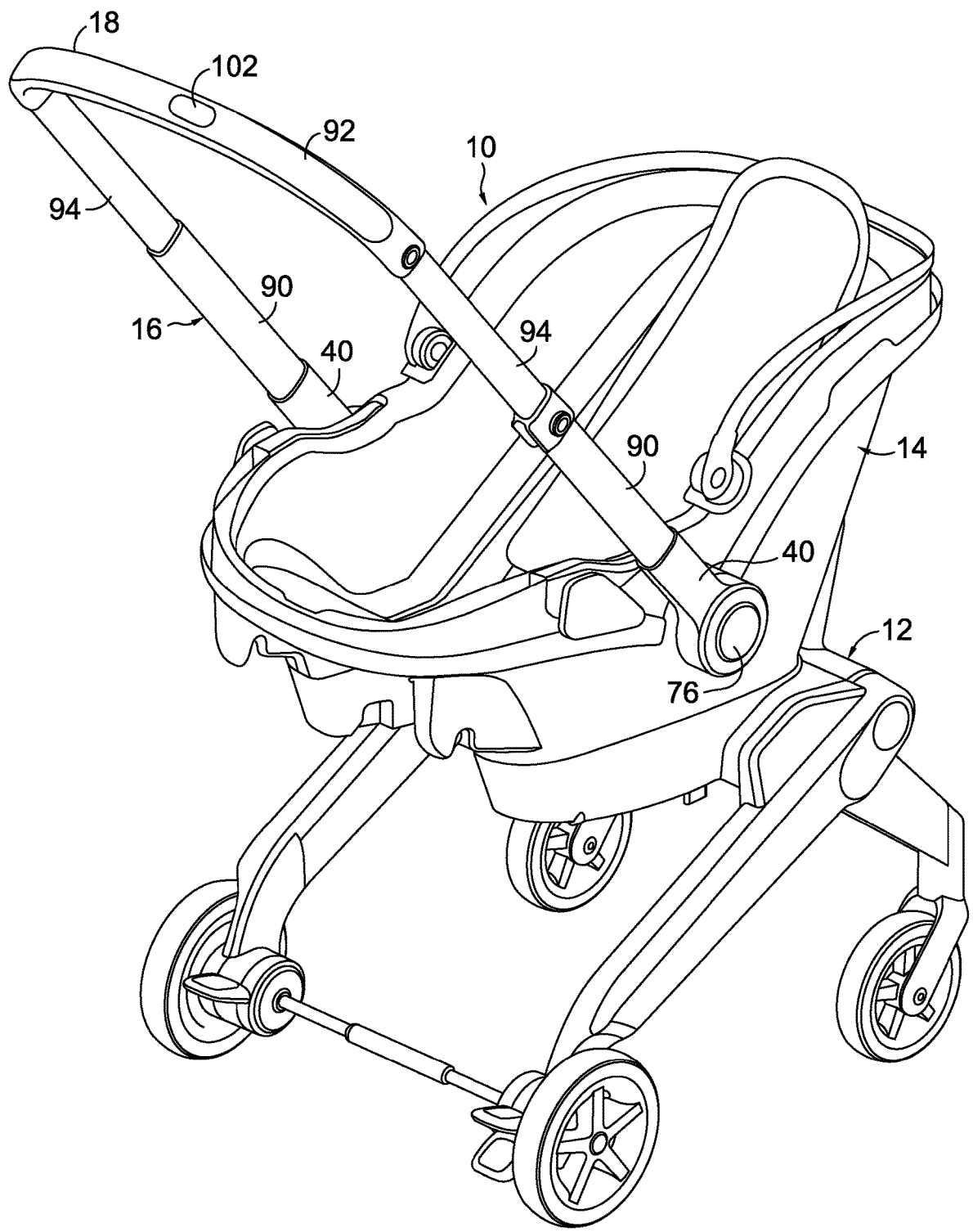
FIG. 4 is a perspective view similar to FIG. 3, but showing the legs deployed and the handle extended in a stroller mode, in accordance with examples herein.

Referring to the drawings, wherein like reference numbers refer to like components, FIGS. 1-19B depict an infant transport assembly 10. With reference to FIGS. 1-4, the infant transport assembly 10, in some examples, includes a chassis 12 coupled to an infant car seat, or shell, 14. While not shown to make other components more visible, the shell 14 may be equipped with padding and an infant safety harness system. A handle assembly 16 is rotatably coupled to the shell 14, as further described below. The handle assembly 16 may be positioned generally vertically, as shown in FIG. 1, with the infant transport assembly 10 in an infant carrier mode. As shown in FIG. 2, the handle assembly 16 may be rotated towards the head end of the shell 14 to position the handle assembly 16 with the infant transport assembly 10 in a car seat mode. As shown in FIG. 3, the handle assembly 16 may also be rotated towards the toe end of the shell 14 as an initial step in positioning the handle assembly 16 for use of the infant transport assembly 10 in a stroller mode. As shown in FIG. 4, a handle extension 18 of the handle assembly 16 may be extended to place the infant transport assembly 10 in a stroller mode.

Figure 18A:
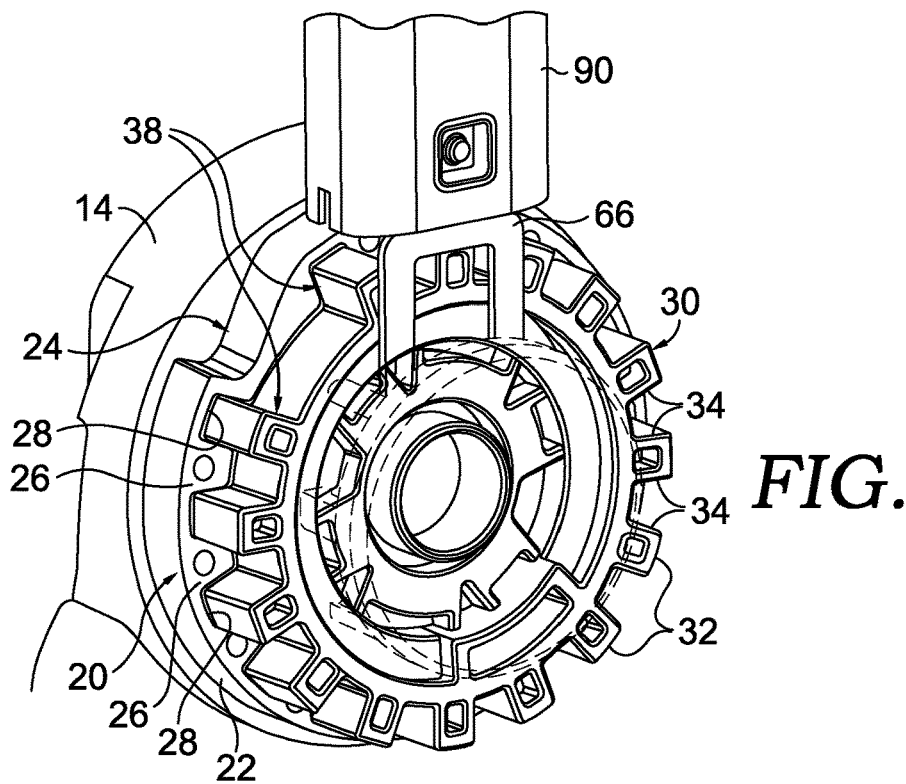
FIG. 18A is an enlarged perspective view showing a sprocket in a locking position, with the release disk shown in phantom lines, in accordance with examples herein.
Figure 18B:
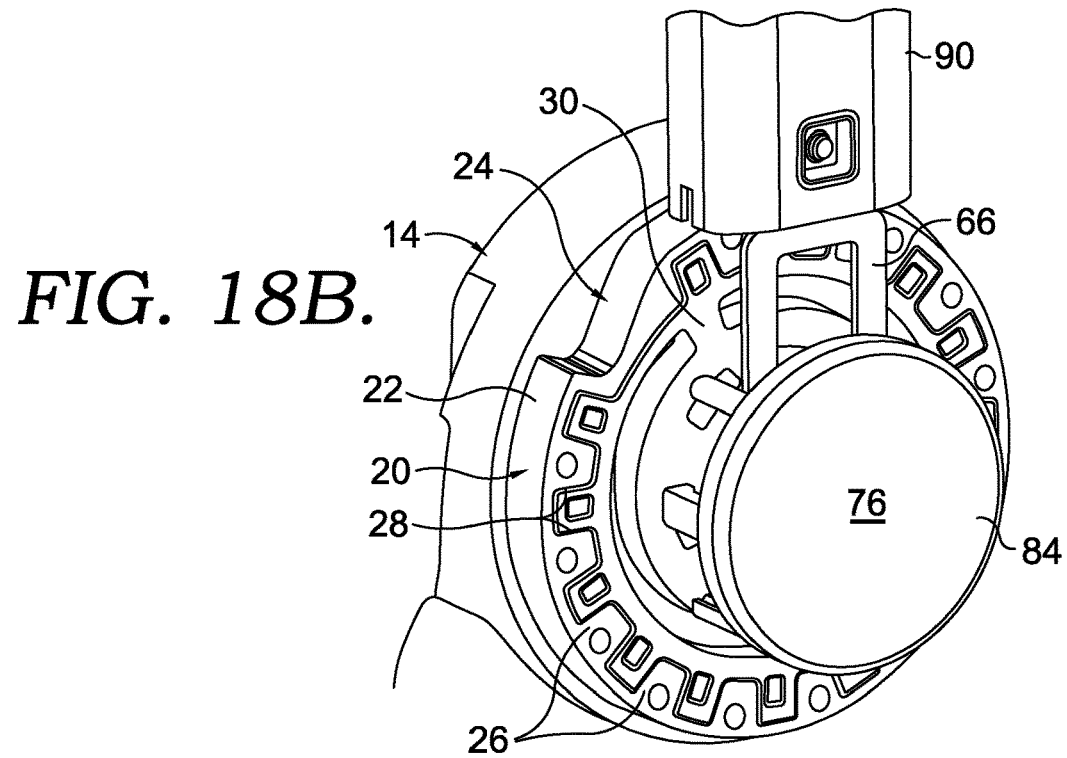
FIG. 18B is an enlarged perspective view showing the sprocket moved to the release position by the release disk, in accordance with examples herein.

The handle assembly 16, in some aspects, is coupled to the shell 14 at a shell hub 20. In some aspects, the shell hub 20 is integrally formed with the shell 14, but it may be a separately formed piece attached to the shell 14. As best seen in FIGS. 18A and 18B, the shell hub 20 may be formed with an outer shelf 22 that projects outwardly from the adjacent body of the shell 14. In some aspects, the outer shelf 22 includes a relief area 24 that is radially inward from the outermost diameter of the outer shelf 22. Further, in some aspects, the shell hub 20 is formed with a series of teeth 26 spaced apart by a series of gaps 28. In some aspects, the teeth 26 and gaps 28 are irregularly spaced, or asymmetrically spaced.

With continued reference to FIGS. 18A and 18B, the handle assembly 16 may include a sprocket 30 that is in axial alignment with the shell hub 20. The sprocket 30 is also formed with a series of teeth 32 spaced apart by a series of gaps 34. In some aspects, the teeth 32 and gaps 34 on the sprocket 30 match the size and spacing of the teeth 26 and gaps 28 on the shell hub 20. The sprocket 30 may also be formed with a larger gap 38 that corresponds in location to the relief area 24 on the shell hub 20. The sprocket 30 is axially moveable both into, and away from, the shell hub 20, the importance of which is further described below. In some aspects, the sprocket 30 may be biased, such as with a spring, away from the shell hub 20 to the position of FIG. 18A.

Figure 14:
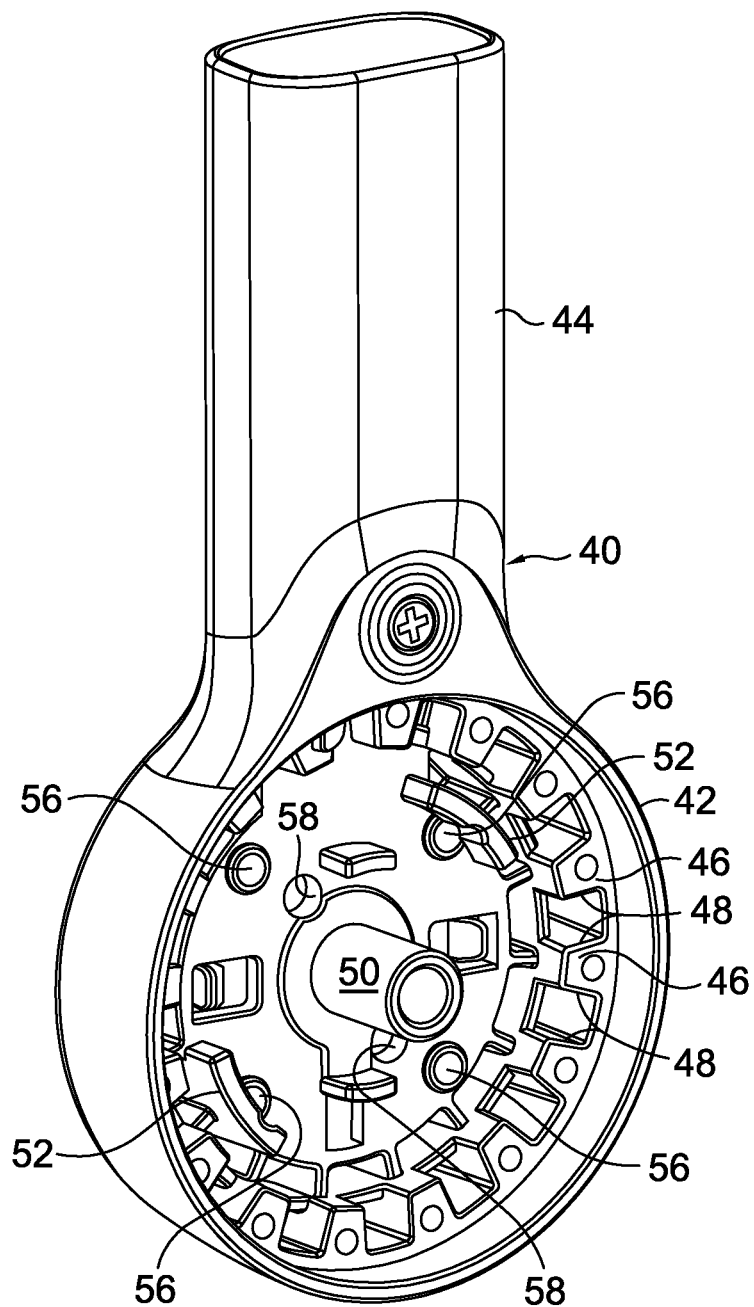
FIG. 14 is a perspective view of the interior side of the handle hub, in accordance with examples herein.
Figure 15:
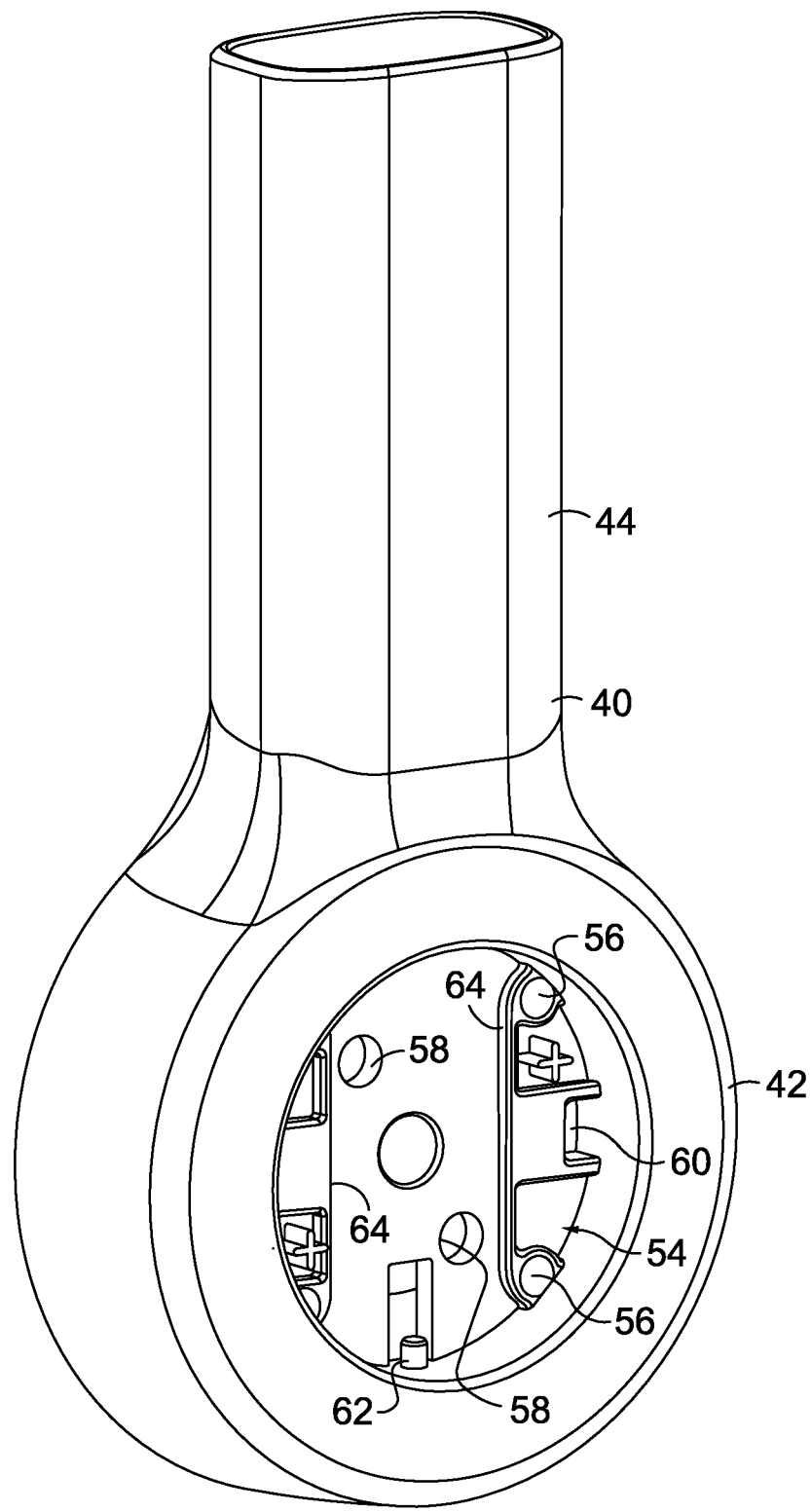
FIG. 15 is a is an enlarged perspective view of the handle hub, from the opposite perspective of FIG. 14, in accordance with examples herein

As best seen in FIGS. 14 and 15, the handle assembly 16 also includes, in some aspects, a handle hub 40. The handle hub 40 may have a rounded lower section 42 and an arm 44 extending away from the lower section 42. As seen in FIG. 14, the interior side of the handle hub 40 includes, in some aspects, a series of teeth 46 spaced apart by a series of gaps 48. In some aspects, the teeth 46 and gaps 48 on the handle hub 40 match the size and spacing of the teeth 26 and gaps 28 on the shell hub 20 and the teeth 32 and gaps 34 on the sprocket 30. The handle hub 40 may also include an axle stub 50 that supports the sprocket 30. Additionally, in some aspects, the handle hub 40 may include guide tabs 52 that align with slots (not shown) on the sprocket 30 to maintain the relative radial position of the sprocket with respect to the handle hub 40. As shown in FIG. 15, the exterior side of the handle hub 40 includes a cylindrical recessed area 54. In the recessed area 54, the handle hub 40 may include a first series of holes 56, a second pair of holes 58 and a pair of lateral slots 60 (only one of which is seen in FIG. 15). The recessed area 54 also may include a spring retainer pin 62, and a guide channel 64.

Figure 17:
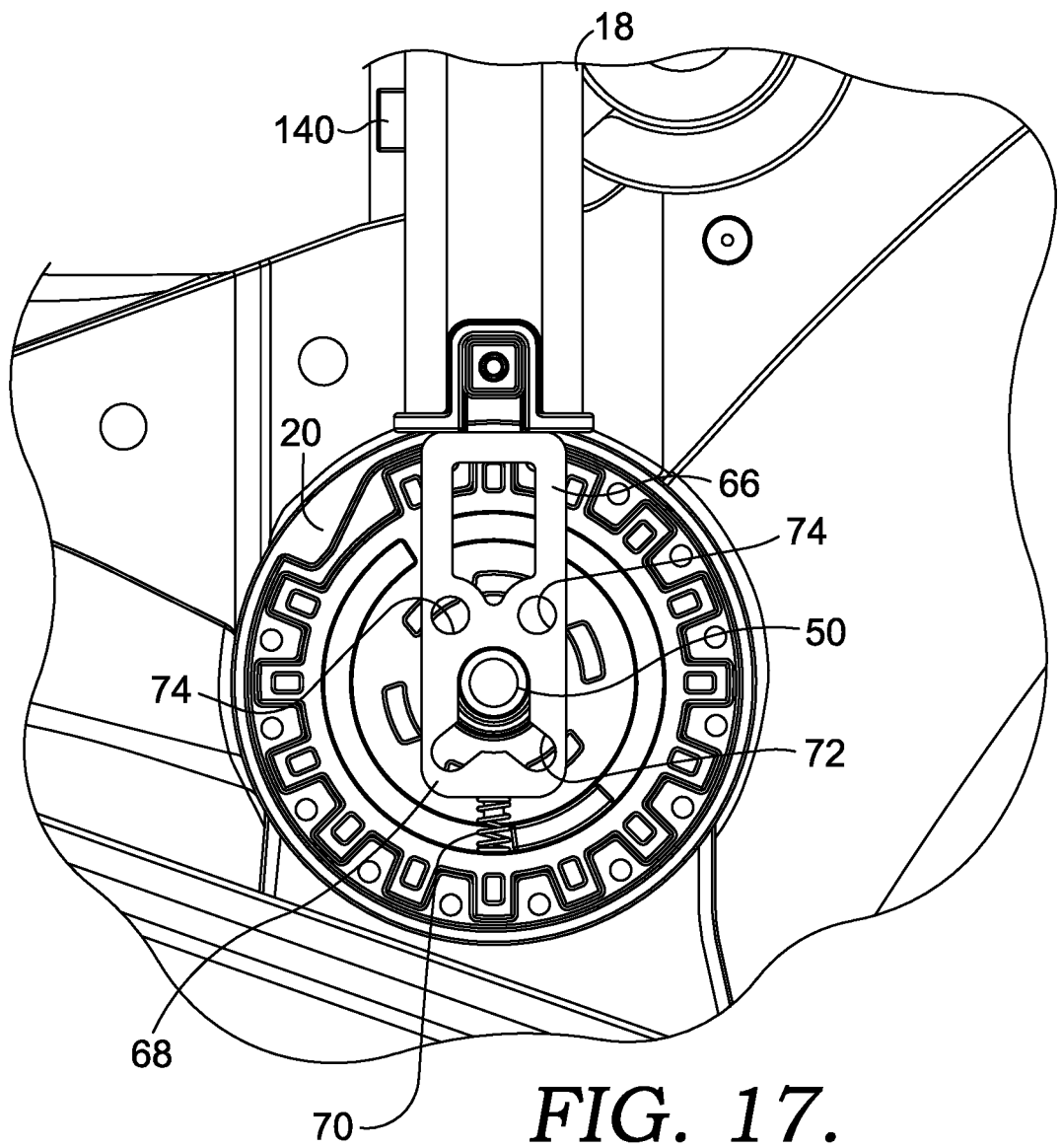
FIG. 17 is an enlarged side plan view showing a block in a first position, in accordance with aspects herein.

As seen in FIG. 17, the handle assembly 16, in some aspects, includes a block 66. The block 66 fits within, and is guided by, the guide channel 64 in the handle hub 40. The block 66 includes a lower end 68 that abuts a spring 70, which is held in position by the spring retainer pin 62. The block 66 also includes a lower slotted area 72. The slotted area 72 has an upper end that accommodates the axle stub 50 of the handle hub, and a bifurcated lower end. Additionally, the block 66 includes two upper holes 74.

Figure 8:
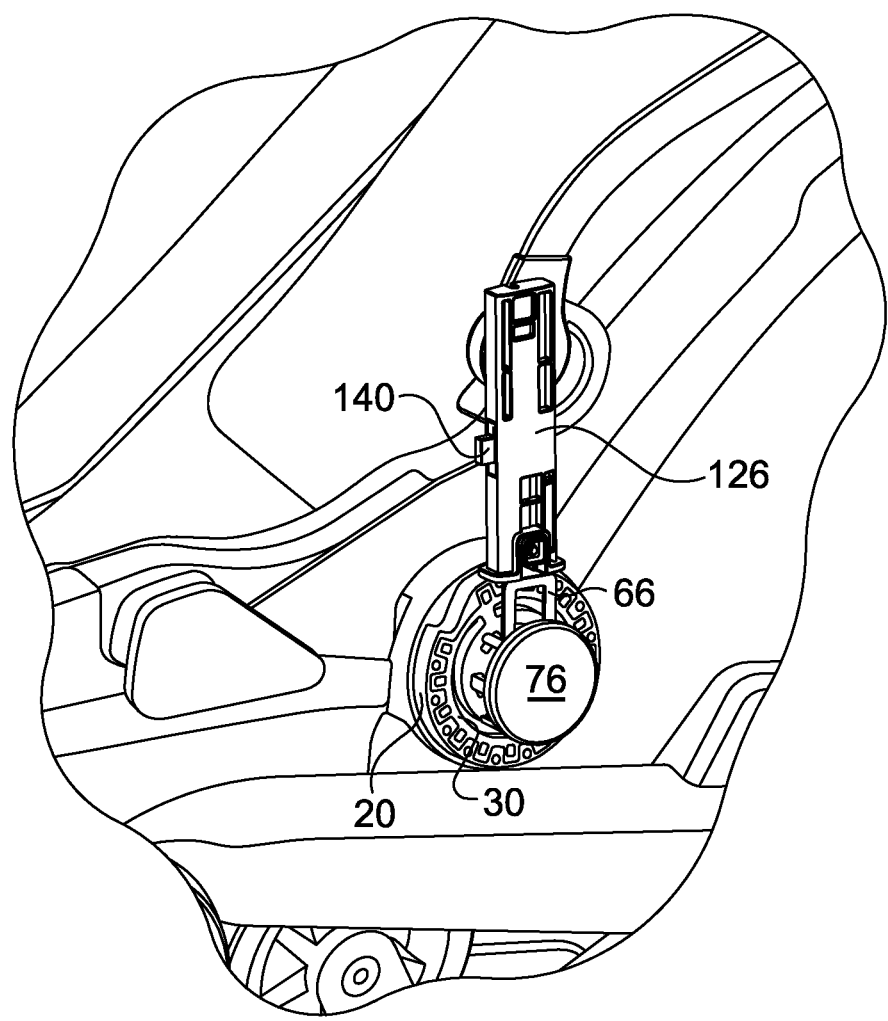
FIG. 8 is a view similar to FIG. 7, but with the handle extension hidden from view to reveal a guide frame, in accordance with examples herein.
Figure 16:
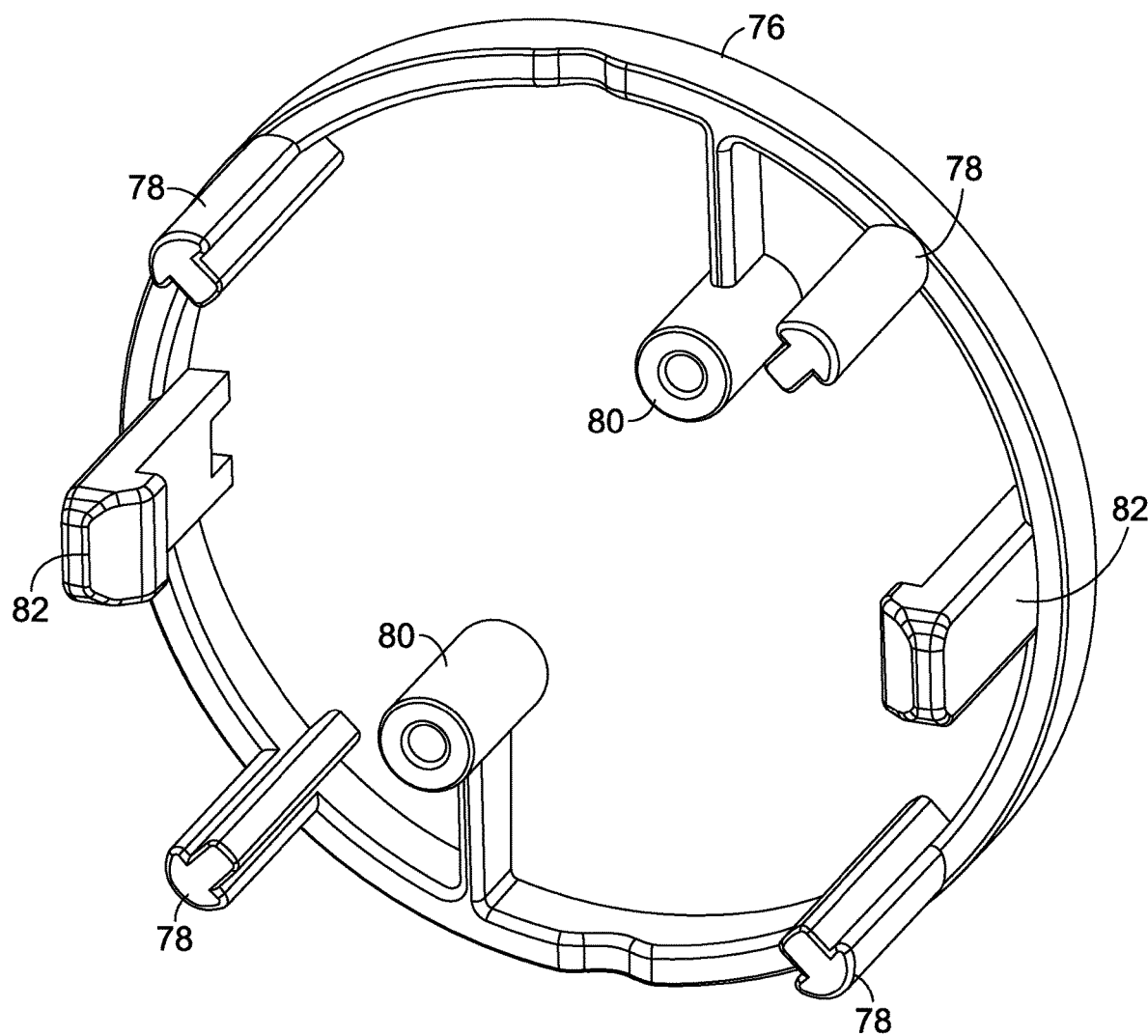
FIG. 16 is a perspective view of a release disk, in accordance with examples herein.

Turning to FIGS. 1, 8 and 16, the handle assembly 16 includes, in some aspects, a release disk 76. The release disk 76 fits within the recessed area 54 and has a diameter slightly less than the diameter of the recessed area 54. The release disk 76 includes, in some aspects, a number of fingers 78 that extend inwardly when the release disk 76 is placed within the recessed area. The fingers 78 extend through, and are guided by, the first holes 56 in the handle hub 40. Similarly, the release disk 76 may also include inner fingers 80 that extend through, and are guided by, second holes 58 in the handle hub 40. Further, the release disk 76 may also include tabs 82 that extend through the lateral slots 60 on the handle hub 40. The tabs 82 may have a hooked end to maintain the release disk 76 in place within the recessed area 54 of the handle hub 40. As seen in FIGS. 1 and 18B, the release disk 76 has an outer surface 84 that provides an engagement surface for users.

As seen in FIG. 18A, the sprocket 30 is biased outwardly (toward the handle hub 40). When the teeth 32 of the sprocket 30 are aligned with the gaps 48 of the handle hub 40, the sprocket 30 engages with the handle hub 40 and prevents the handle hub 40 from rotating. To release the sprocket 30 from the handle hub 40, a user may press on the outer surface 84 of the release disk 76. One or more of the fingers 78 and the fingers 80 act upon the sprocket 30, moving the sprocket 30 inwardly and out of engagement with the teeth 46 and gaps 48 in the handle hub 40 (to the position shown in FIG. 18B). With the sprocket in this position, the handle hub 40 may be rotated by the user. In some aspects, the irregular spacing of the teeth 46 on the handle hub, and the irregular spacing of the teeth on the sprocket 30, allows the handle hub 40 to be locked in position in only three positions: the stroller position (FIGS. 3 and 4), the infant carrier position (FIG. 1) and the car seat position (FIG. 2). In any of these three positions, the teeth 32 of the sprocket align with the gaps 48 of the handle hub 40. Once aligned, the spring biasing force will move the sprocket 30 outwardly and into engagement with the handle hub 40, locking the handle hub 40 in place.

Returning to FIG. 1, the handle assembly 16 includes the handle extension 18, as discussed above. The handle extension 18 is received within a sleeve 90 on each side of the shell 14. The sleeve 90 is, in turn, coupled within the arm 44 of the handle hub 40. Both the handle extension 18 and the sleeve 90 rotate with the handle hub 40. The handle extension 18 includes a top portion 92 that extends between a pair of downwardly extending legs 94 (as best seen in FIG. 4). Each leg 94 is received within a corresponding sleeve 90. The handle extension 18 may be moved between a stowed position, as seen in FIGS. 1, 2 and 3, and an extended position, as seen in FIG. 4.

Figure 5:
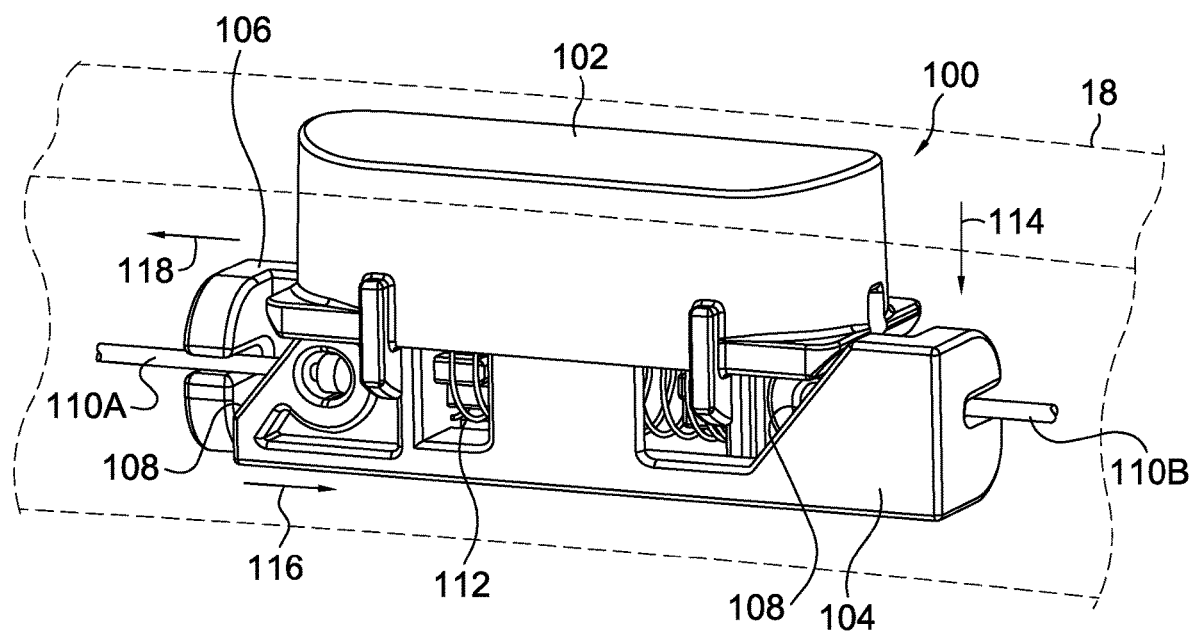
FIG. 5 is an enlarged view of the encircled region 5 in FIG. 1, shown with certain parts hidden to reveal details of construction, in accordance with examples herein.

Because it may be undesirable for the handle extension 18 to move to the extended position in the infant carrier mode (of FIG. 1) and the car seat mode (of FIG. 2), the handle assembly 16 includes, in some aspects, a locking mechanism, broadly designated as 100 in the figures. As best seen in FIGS. 1 and 5, the locking mechanism 100 includes a release button 102 received within the handle extension 18. The release button 102 is moveable into, and out of, the handle extension 18. The release button 102 interacts with a first carriage 104 and a second carriage 106. In FIG. 5, the first carriage 104 is more visible than the second carriage 106, but the second carriage 106 has a similar construction to the first carriage 104. Each carriage 104, 106 includes a pair of spaced apart, angled cam surfaces 108. Additionally, each carriage 104, 106 is coupled to a cable 110 at one end of the respective carriage. The cable 110 extends through the handle extension 18, as further described below. As shown in FIG. 5, the cable 110A is coupled to the first carriage 104 and the cable 110B is coupled to the second carriage 106. In some aspects, the first carriage 104 is coupled to the second carriage 106 with a spring 112 that biases the first carriage 104 and the second carriage 106 inwardly (towards one another). As the release button 102 is pressed downwardly (indicated by arrow 114 in FIG. 5), the release button 102 acts upon the cam surfaces 108, moving the first carriage 104 away from the second carriage 106. In other words, when the release button 102 is pressed downwardly, the first carriage 104 will move to the right (indicated by arrow 116 in FIG. and as viewed from the perspective of FIG. 5), and the second carriage 106 will move to the left (indicated by arrow 118 in FIG. 5). This movement of the carriages 104, 106 pulls the cables 110A and 110B. After the pressing force is released, the spring 112 acts to pull the carriages 104, 106 back towards one another.

Figure 9:
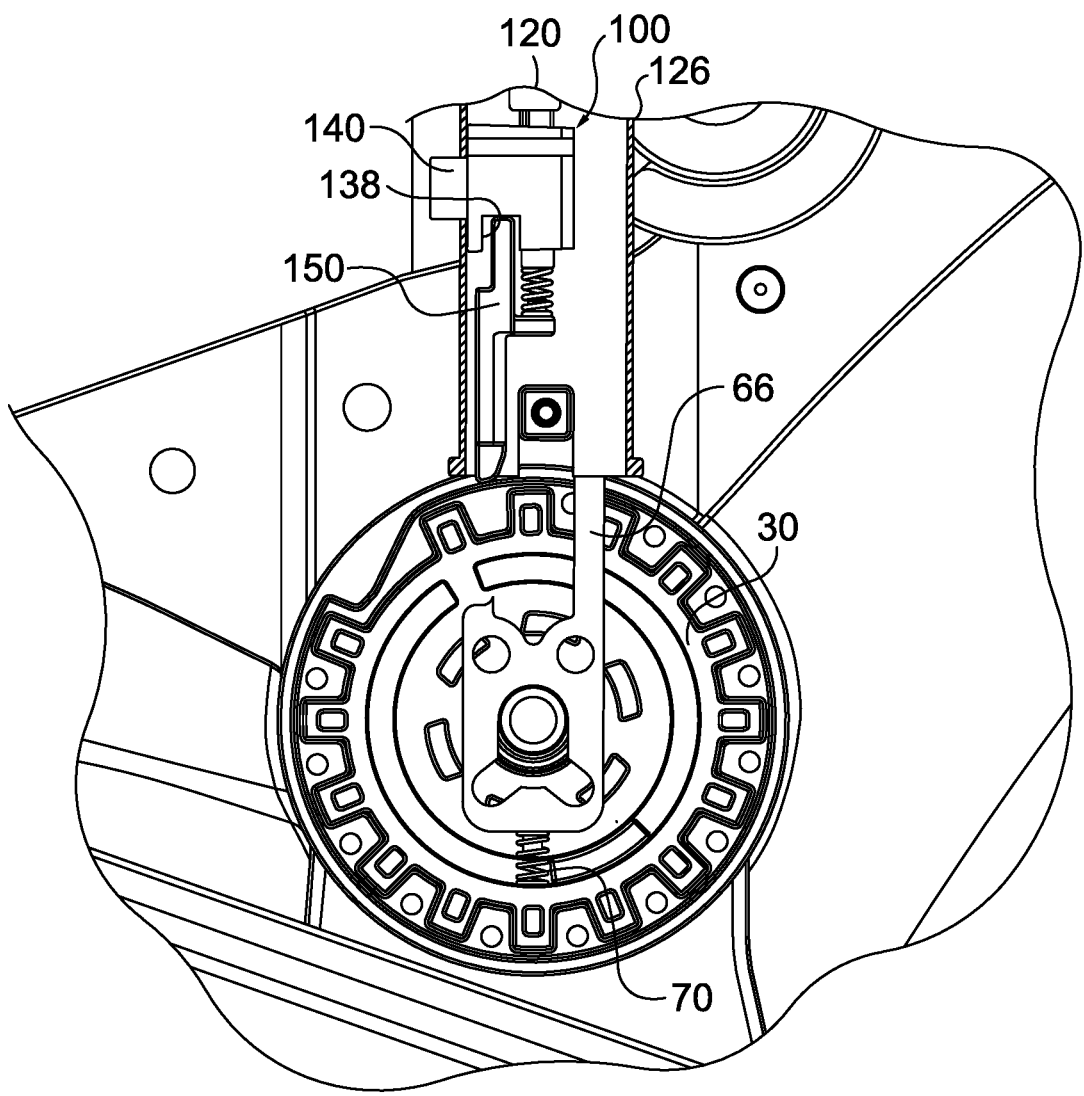
FIG. 9 is an enlarged side plan view similar to FIG. 8, with certain parts hidden and showing internal components within the guide frame, in accordance with examples herein.
Figure 10:
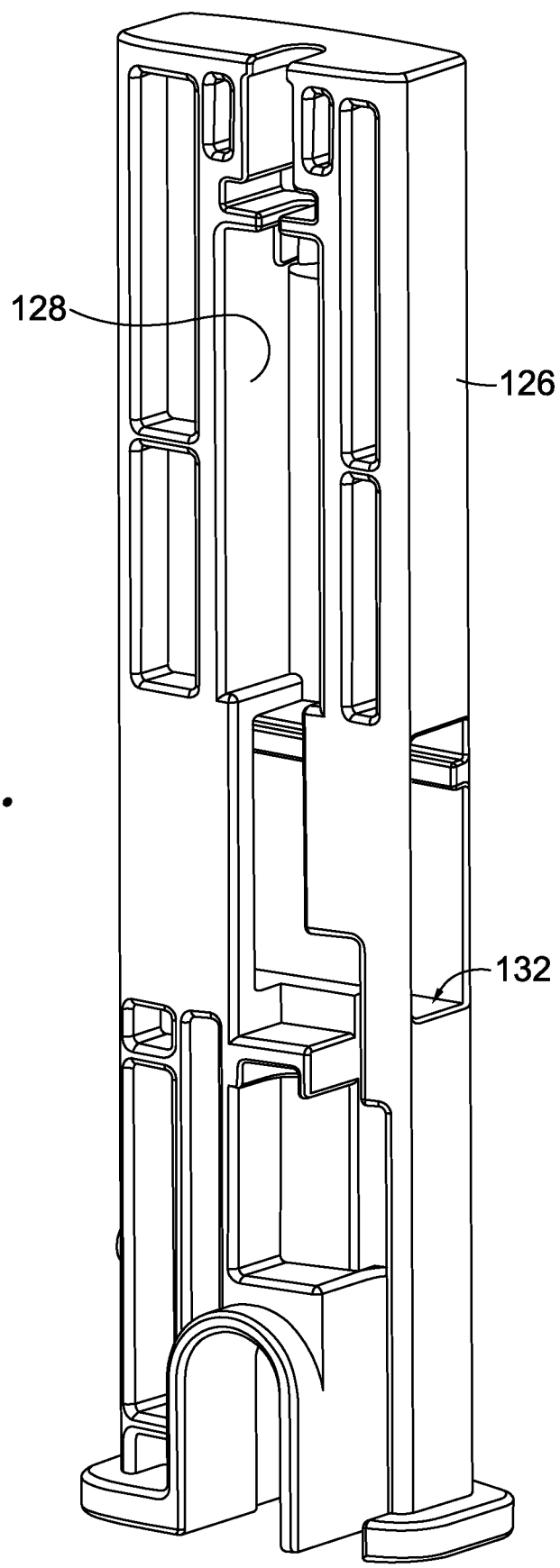
FIG. 10 is an enlarged view of the guide frame, in accordance with examples herein.
Figure 11:
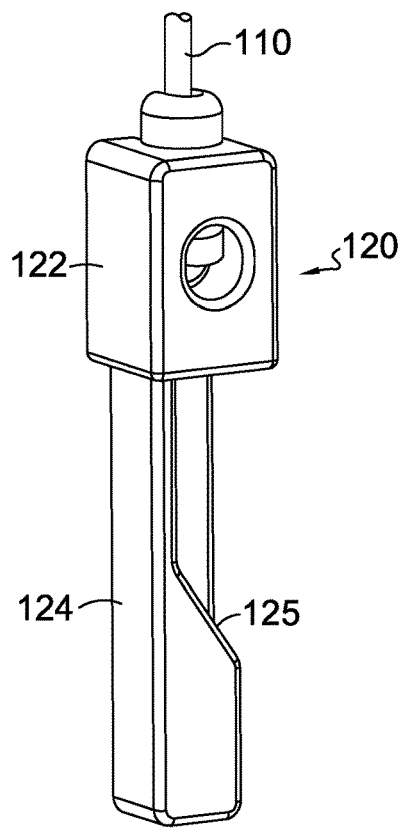
FIG. 11 is an enlarged view of a post of the locking mechanism, in accordance with examples herein.
Figure 19A:
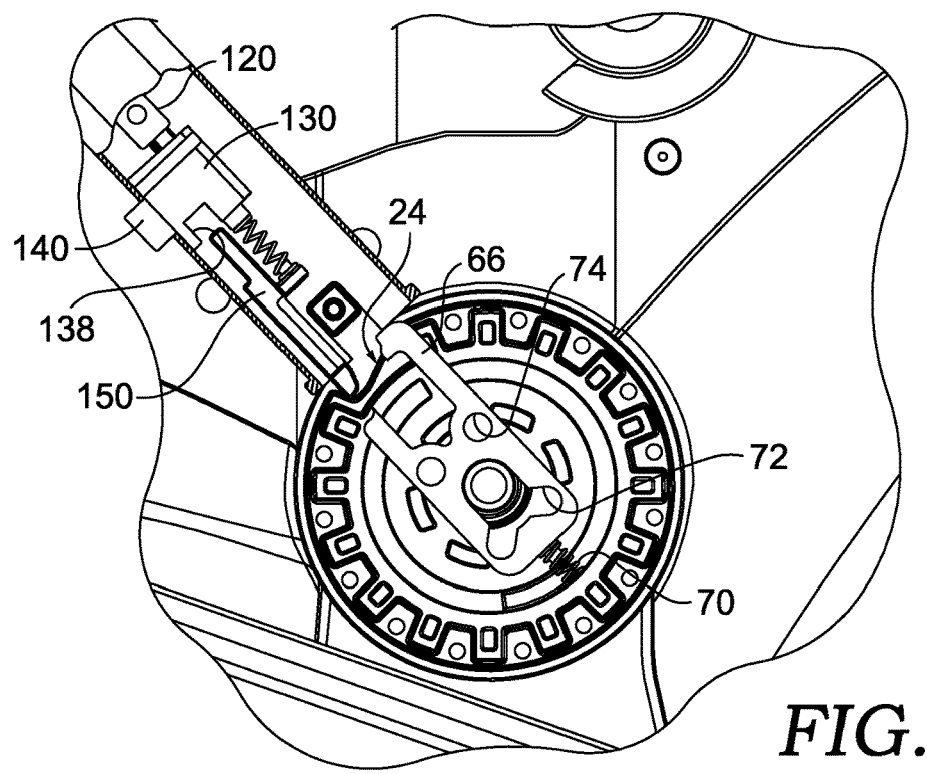
FIG. 19A is a view with the handle assembly in the stroller mode, with the handle extension retracted.

As best seen in FIGS. 9, 11 and 19A, the end of each cable 110 opposite the carriages 104, 106 is coupled to a corresponding post 120. The post 120 includes, in some aspects, an upper guide block 122, and a lower arm 124. The lower arm 124 is formed with an angled cam surface 125. The post 120 is held within a guide frame 126, as seen in FIGS. 8 and 10. The guide frame 126 is held within the lower extent of the handle extension 18. The guide block 122 of the post 120 fits within a channel 128 in the guide frame 126, allowing the post 120 to move up (and down) within the channel 128, as the release button 102 is pressed, causing the first carriage 104 and the second carriage 106 to pull the cables 110.

Figure 6:
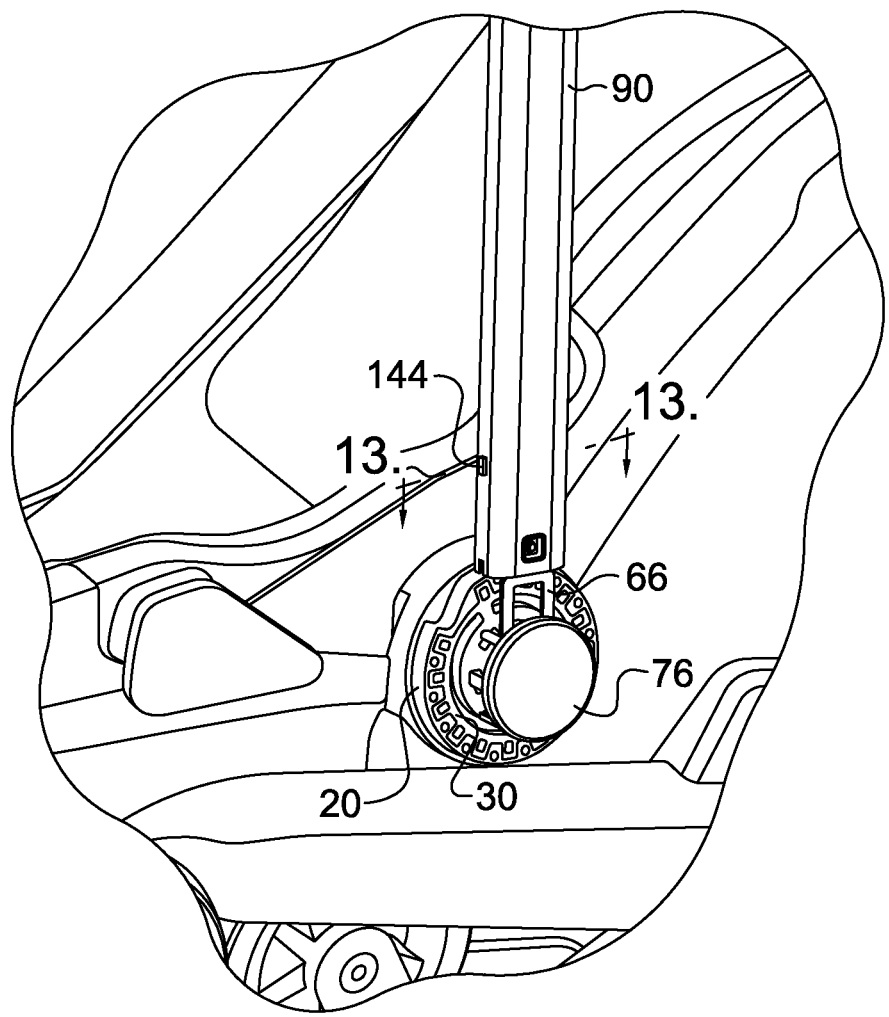
FIG. 6 is an enlarged view of the shell hub and sleeve, with the handle hub hidden from view, in accordance with examples herein.
Figure 7:
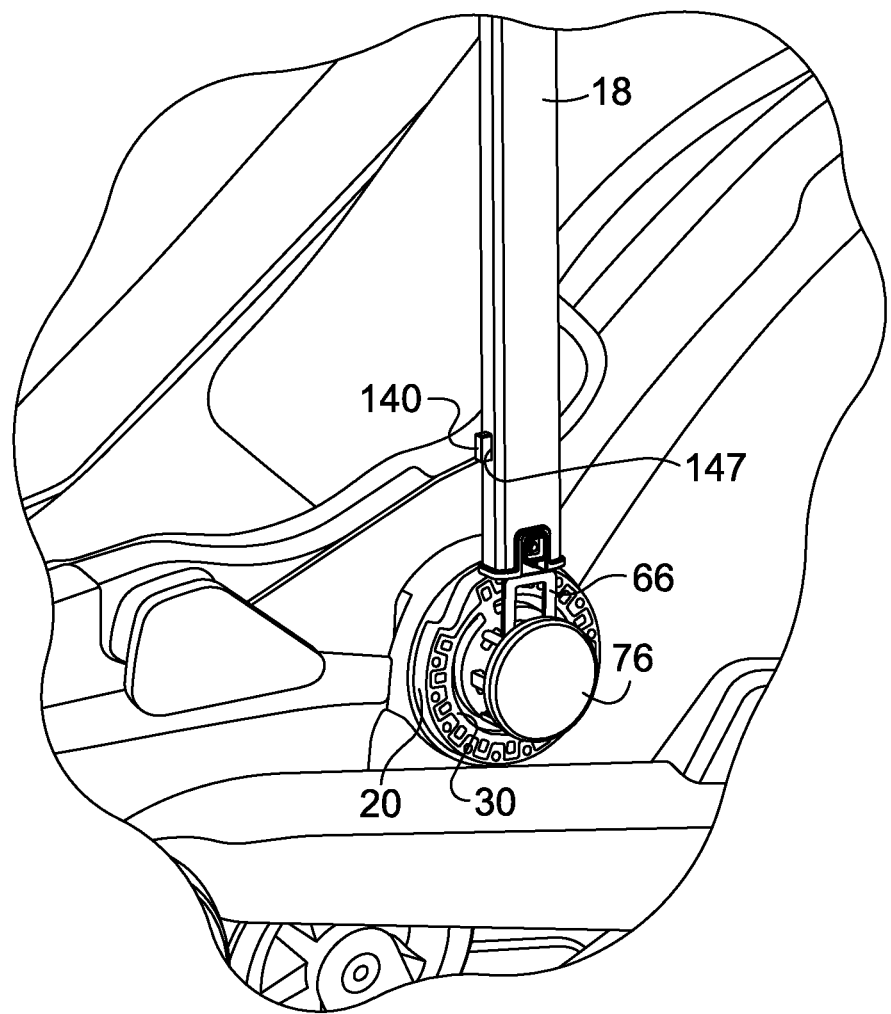
FIG. 7 is a view similar to FIG. 6, but with the sleeve hidden from view to reveal a handle extension, in accordance with examples herein.
Figure 12:
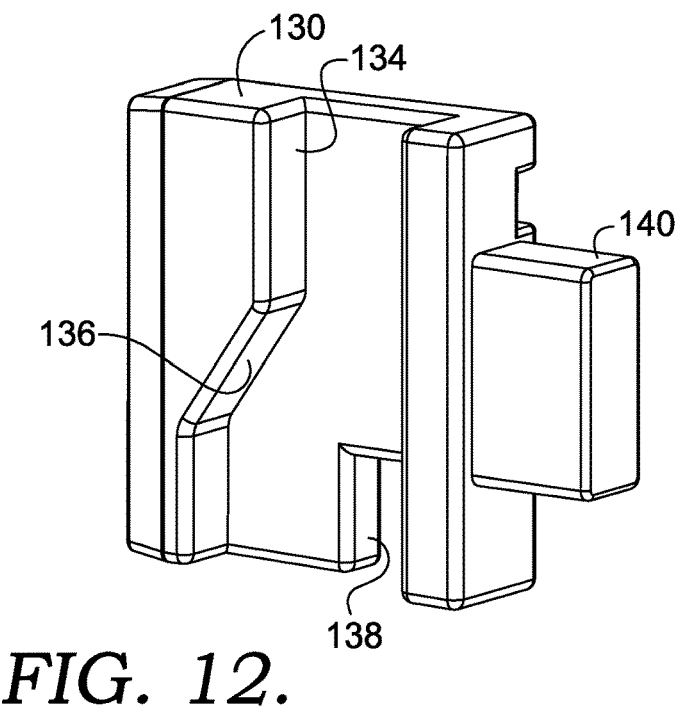
FIG. 12 is an enlarged view of a locking tab of the locking mechanism, in accordance with examples herein.
Figure 13:
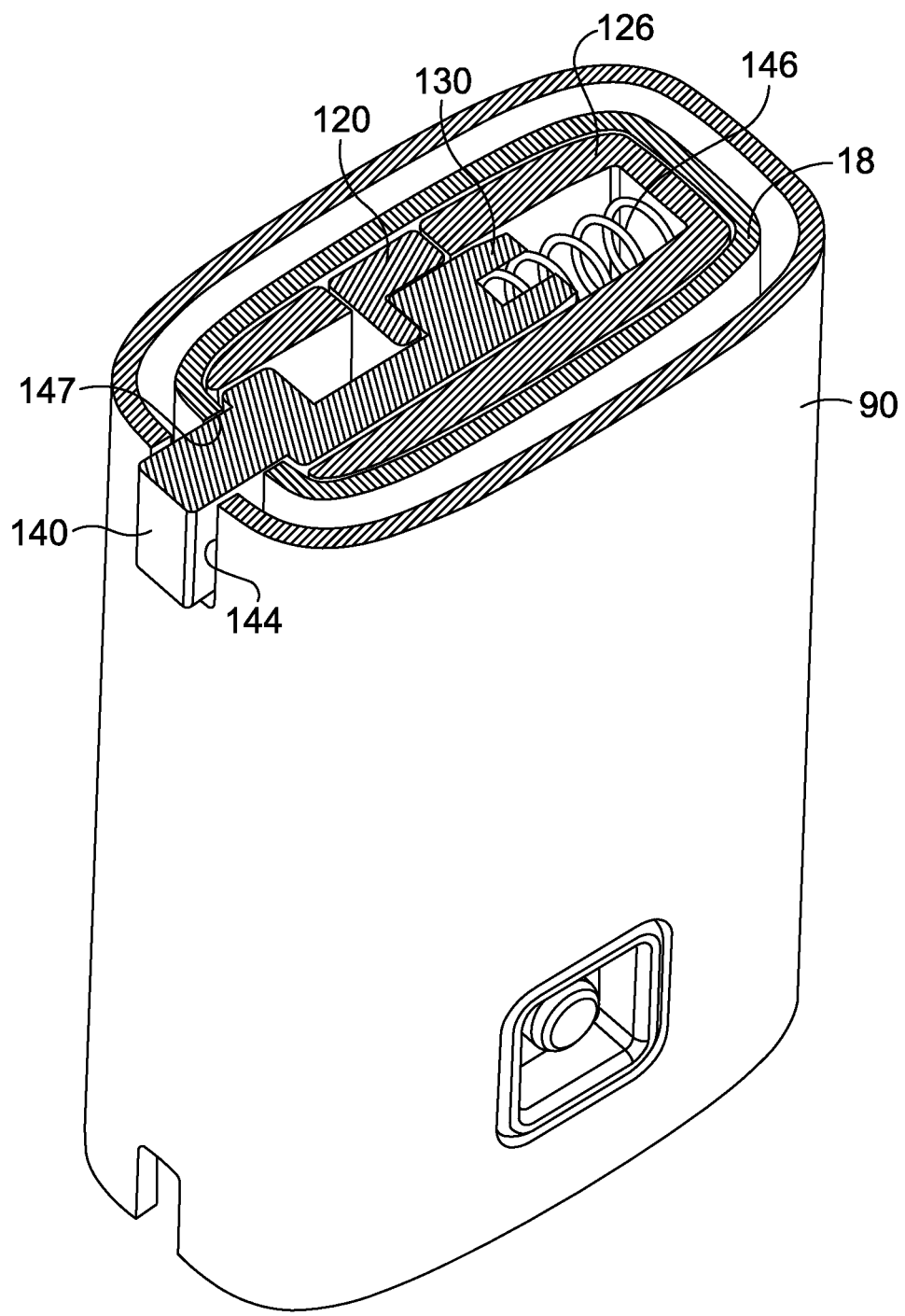
FIG. 13 is a cross-sectional view along line 13-13 of FIG. 6, in accordance with examples herein.

With reference to FIGS. 10 and 12, the guide frame 126 also holds a moveable bar 130 within a channel 132. The bar 130 is generally rectangular, and includes an internal channel 134 with an angled cam surface 136. The bar 130 also includes a lower slot 138, the importance of which is described further below. Additionally, the bar 130 includes a locking tab 140 that extends outwardly. The bar 130 is able to move laterally within the channel 132. As best seen in FIG. 13, when the release button is pressed, the post 120 is pulled upwardly, and the cam surface 125 acts on the cam surface 136 of the bar 130, translating the upward motion of the post 120 into lateral movement of the bar 130 (moving the bar 130 inwardly). The sleeve 90 includes an upper slot 142 (as seen in FIG. 1) and a lower slot 144 (as seen in FIGS. 6 and 13). The bar 130 is biased outwardly (such as by a spring 146 shown in FIG. 13) such that the locking tab 140 extends through a slot 147 in the handle extension 18 (as best seen in FIGS. 7 and 13) and through either the upper slot 142 or the lower slot 144 when the slot 147 in the handle extension is in alignment with either the upper slot 142 or the lower slot 144. This acts to lock the handle extension 18 in either the extended position (using the upper slot 142) or the lowered position (using the lower slot 144).

As stated above, however, it may be undesirable to allow the handle extension 18 to be moved to the extended position when the handle assembly 16 is in any position except the stroller position. As best seen in FIGS. 9 and 19A, a locking finger 150 is held within the guide frame 126, allowing the finger 150 to move upwardly and downwardly within the guide frame 126. In some aspects, the finger 150 is biased downwardly. As best seen in FIG. 9, the lower end of the finger 150 abuts the outer shelf 22 of the shell hub when the handle assembly is in the vertical, infant carrier position. While not shown, the lower end of the finger 150 also abuts the outer shelf 22 of the shell hub 20 when the handle assembly 16 is in the car seat position of FIG. 2. With the handle assembly 16 in either vertical, infant carrier position or the car seat position, the outer shelf 22 forces the finger 150 upwardly. In this upward position, the upper end of the finger 150 engages the lower slot 138 of the bar 130. With the finger 150 engaged with the lower slot 138, the bar 130 is prevented from moving inwardly to release the handle extension 18 from the sleeve thus preventing the handle extension 18 from moving to the extended position, even if the release button 102 is pressed. However, as best seen in FIG. 19A, when the handle assembly 16 is rotated to the stroller position, the finger 150 is allowed to lower (and is biased to move to the lower position) due to the relief area 24 in the shell hub 20. With the finger 150 in this lower position, the release button 102 may be pressed, and the bar 130 is allowed to move inwardly (because the upper end of the finger 150 is away from the slot 138 in the bar 130), releasing the tab 140 from the lower slot 144 in the sleeve 90, thus allowing the handle extension 18 to be pulled upwardly, until the tab 140 engages the upper slot 144 to lock the handle extension 18 in the extended position of FIG. 4.

Figure 19B:
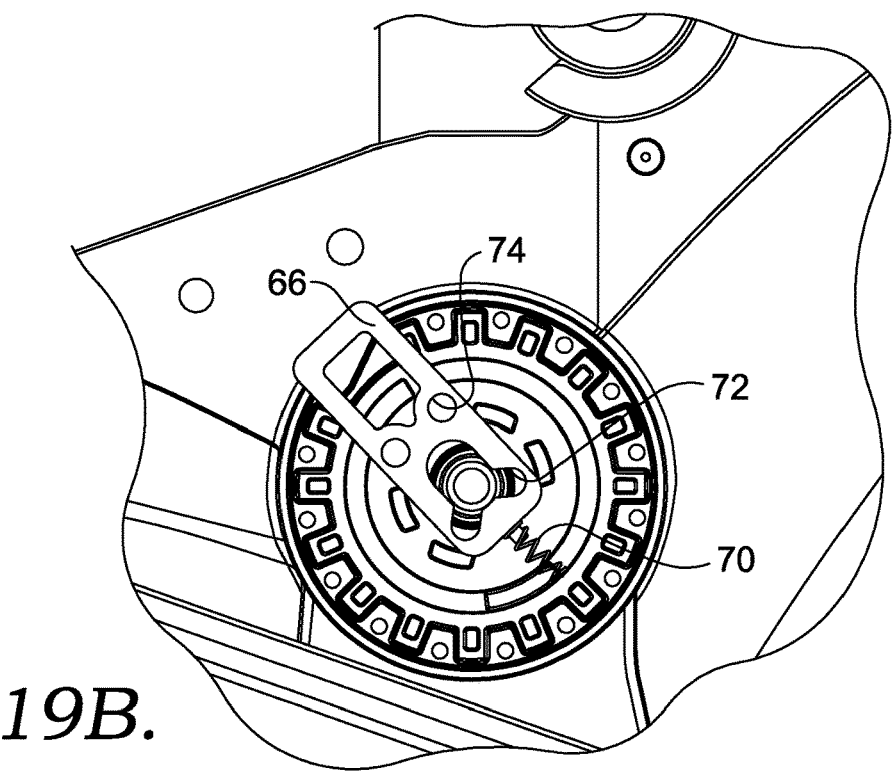
FIG. 19B is a view with the handle assembly in the stroller mode, with the handle extension extended.

It may also be undesirable for the handle assembly 16 to rotate from the stroller position of FIG. 4, without first lowering the handle extension 18. As seen in FIGS. 17 and 19A, with the handle extension 18 lowered, the lower end of the handle extension 18 abuts the block 66, lowering the block 66 and overcoming the spring force of the spring 70. In this lowered position, the lower part of the slotted area 72 and the upper holes 74 are aligned with the fingers 80 on the release disk 76. This allows the release disk 76 to be moved inwardly, releasing the sprocket 30 from the handle hub 40, and allowing the handle hub 40 to rotate. However, as seen in FIG. 19B, when the handle extension 18 is moved to the extended position, the block 66 is moved upwardly by the force of spring 70 (because the handle extension 18 is no longer preventing this movement). In this upward position, the block 66 prevents the release disk 76 from being pressed inwardly, because the upper holes 74 are no longer aligned with the fingers 80 on the release disk. When the release disk 76 is prevented from inward movement, the sprocket 30 remains engaged with the handle hub 40, and the handle hub 40 is prevented from rotation. When the handle extension 18 is lowered, the block 66 will also be lowered, and the release disk 76 may be pressed inwardly so the handle hub 40 can be rotated.

The handle assembly 16 described herein provides a structure that ensures the handle can be positioned only as designed in the infant carrier (vertical) positioned, a rearwardly angled car seat position, and a forwardly angled stroller position. Additionally, the handle assembly 16 is allowed to extend only when rotated to the stroller orientation, but is prevented from extending in any other position. When in the stroller position, with the handle extended, the structure prevents the handle assembly from rotating back to the vertical position, unless the handle is first returned to a retracted position. All of these features are desirable in a convertible infant carrier and stroller.

The following clauses provide example configurations of a handle assembly for an infant transport system as disclosed herein.

Clause 1. A handle assembly for an infant carrier having a shell, the handle assembly comprising: a shell hub, on the shell, the shell hub having an outer perimeter and a first series of teeth spaced adjacent the outer perimeter; a handle hub in axial alignment with the shell hub, the handle hub having a second series of teeth spaced adjacent an outer perimeter of the handle hub; a sprocket in axial alignment with the shell hub and the handle hub, the sprocket being located between the shell hub and the handle hub, the sprocket having a third series of teeth spaced about an outer perimeter of the sprocket; wherein the sprocket is axially movable from a first position locking the shell hub to the handle hub, and a second position unlocking the handle hub from the shell hub, and wherein in the second position, the handle hub is rotatable with respect to the shell hub.

Clause 2. The handle assembly of clause 1, further comprising a spring, engage-able with the sprocket, to bias the sprocket towards the first position.

Clause 3. The handle assembly of any of clauses 1-2, further comprising a release disk, in axial alignment with the shell hub, the handle hub and the sprocket, and wherein the release disk is axially movable with respect to the handle hub, the release disk movable between a lock position where the release disk is disengaged from the sprocket with the sprocket in the first position and a release position where the release disk engages the sprocket with the sprocket in the second position, the release disk overcoming the spring force in the release position.

Clause 4. The handle assembly of any of clauses 1-3, wherein the release disk has a plurality of spaced fingers that releasably engage the sprocket.

Clause 5. The handle assembly of any of clauses 1-4, wherein the first series of teeth, the second series of teeth and the third series of teeth are asymmetrically spaced.

Clause 6. The handle assembly of any of clauses 1-5, wherein the asymmetrical spacing of the first series of teeth, the second series of teeth and the third series of teeth allow a limited number of positions for the handle hub with respect to the shell hub.

Clause 7. The handle assembly of any of clauses 1-6, wherein handle hub further comprises an arm extending radially away from the outer perimeter, and wherein the limited number of positions for the handle hub with respect to the shell hub correspond to a carrying position with the arm extending generally vertically, a stroller position with the arm angled in a first direction away from vertical, and a car seat position with the arm angled in a second direction away from vertical, the first direction opposite the second direction.

Clause 8. The handle assembly of any of clauses 1-7, further comprising: a sleeve coupled to the arm of the handle hub; a handle extension, having a top portion, the handle extension slidably coupled to the sleeve, the handle extension movable between a retracted position and an extended position, wherein, in the extended position, the top is farther from the handle hub than in the retracted position; a locking mechanism having a movable tab selectively coupling the sleeve to the handle extension in both the retracted position and the extended position; and a release button movably held within the handle extension top portion, the release button operably coupled to the locking mechanism to selectively move the tab to uncouple the sleeve from the handle extension and allow the handle extension to move with respect to the sleeve.

Clause 9. The handle assembly of any of clauses 1-8, further comprising a finger movably held within the sleeve, the finger having a first position where the finger is engaged with the tab, preventing movement of the tab to maintain the coupling of the sleeve and the handle extension, and the finger having a second position where the finger is disengaged from the tab, allowing movement of the tab by the release button to disengage the finger from the tab and allowing the handle extension to move with respect to the sleeve.

Clause 10. The handle assembly of any of clauses 1-9, wherein the shell hub includes an outer shelf preventing the finger from disengaging from the tab, the shelf having a relief portion aligned with the handle arm when the arm is in the stroller position, and wherein the relief area allows the finger to disengage with the tab only in the stroller position.

Clause 11. The handle assembly of any of clauses 1-10, further comprising a spring-biased block held within the handle hub, the block having a first position allowing the release disk to move to the release position, and a second position preventing the release disk from moving to the release position, and wherein the handle extension abuts the block to overcome the spring-bias and maintain the block in the first position when the handle extension is in the retracted position, and wherein the spring-bias moves the block to the second position when the handle extension is in the extended position, such that the handle hub can only be rotated with the handle extension in the retracted position.

Clause 12. A convertible infant carrier and stroller assembly comprising: a shell having a head end, a toe end, and spaced apart sides extending from the head end to the toe end; a pair of shell hubs, one on each side of the shell, each shell hub having an outer perimeter and a first series of teeth spaced adjacent the outer perimeter; a pair of handle hubs, one in axial alignment with a corresponding shell hub, each handle hub having a second series of teeth spaced adjacent an outer perimeter of each handle hub; a pair of sprockets, one in axial alignment with a corresponding shell hub and handle hub, each sprocket being located between a corresponding shell hub and handle hub, each sprocket having a third series of teeth spaced about an outer perimeter of the sprocket; wherein each sprocket is axially movable from a first position locking the corresponding shell hub and the handle hub, and a second position unlocking the corresponding handle hub and shell hub, and wherein in the second position, each handle hub is rotatable with respect to the corresponding shell hub.

Clause 13. The assembly of clause 12, comprising: further comprising a biasing means for biasing the sprocket towards the first position.

Clause 14. The assembly of any of clauses 12-13, further comprising a pair of release disks, each of the pair of release disks in axial alignment with one of the shell hubs, the handle hubs and the sprockets, and wherein each release disk is axially movable with respect to the corresponding handle hub, each release disk movable between a lock position where the release disk is disengaged from the sprocket with the sprocket in the first position and a release position where the release disk engages the sprocket with the sprocket in the second position, each release disk overcoming the corresponding spring force in the release position.

Clause 15. The assembly of any of clauses 12-14, wherein the first series of teeth, the second series of teeth and the third series of teeth are asymmetrically spaced, and allow only three positions of each handle hub with respect to the corresponding shell hub.

Clause 16. The assembly of any of clauses 12-15, wherein handle hub further comprises an arm extending radially away from the outer perimeter, and wherein the positions for the handle hub with respect to the shell hub correspond to a carrying position with the arm extending generally vertically, a stroller position with the arm angled in a first direction away from vertical, and a car seat position with the arm angled in a second direction away from vertical, the first direction opposite the second direction.

Clause 17. The assembly of any of clauses 12-16, further comprising: a sleeve coupled to each arm of each handle hub; a handle extension, having a top portion, the handle extension slidably coupled to each sleeve with the top portion extending from one side of the shell to the opposite side, the handle extension movable between a retracted position and an extended position, wherein, in the extended position, the top is farther from the handle hub than in the retracted position; a locking mechanism having a pair of movable tabs, each tab selectively coupling one of the sleeves to the handle extension in both the retracted position and the extended position; and a release button movably held within the handle extension top portion, the release button operably coupled to the locking mechanism to selectively move the tabs to uncouple the sleeves from the handle extension and allow the handle extension to move with respect to the sleeve.

Clause 18. The assembly of any of clauses 12-17, further comprising a means for selectively allowing the movement of the tabs only when the handle hub is in the stroller position.

Clause 19. The assembly of any of clauses 12-18, further comprising a means for preventing the release disks from moving to the release position when the handle extension is in the extended position.

Clause 20. The assembly of any of clauses 12-19, wherein each release disk has a plurality of spaced fingers that releasably engage a corresponding sprocket.

To assist and clarify the description of various embodiments, various terms are defined herein. Unless otherwise indicated, the following definitions apply throughout this specification (including the claims). Additionally, all references referred to are incorporated herein in their entirety.

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. As used in the description and the accompanying claims, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A handle assembly for an infant carrier having a shell, the handle assembly comprising:
    a shell hub, on the shell, the shell hub having an outer perimeter and a first series of teeth spaced adjacent the outer perimeter;
    a handle hub in axial alignment with the shell hub, the handle hub having a second series of teeth spaced adjacent an inner perimeter of the handle hub;
    a sprocket in axial alignment with the shell hub and the handle hub, the sprocket being located between the shell hub and the handle hub, the sprocket having a third series of teeth spaced about an outer perimeter of the sprocket;
    wherein the sprocket is axially movable from a first position locking the shell hub to the handle hub, and a second position unlocking the handle hub from the shell hub, and wherein in the second position, the handle hub is rotatable with respect to the shell hub;
    the handle assembly further comprising a spring, engageable with the sprocket, to bias the sprocket towards the first position; and
    a release disk, in axial alignment with the shell hub, the handle hub and the sprocket, and wherein the release disk is axially movable with respect to the handle hub, the release disk movable between a lock position where the release disk is disengaged from the sprocket with the sprocket in the first position and a release position where the release disk engages the sprocket with the sprocket in the second position, the release disk overcoming the spring force in the release position.

2. The handle assembly of claim 1, wherein the release disk has a plurality of spaced fingers that releasably engage the sprocket.

3. The handle assembly of claim 1, wherein the first series of teeth, the second series of teeth and the third series of teeth are asymmetrically spaced.

4. The handle assembly of claim 3, wherein the asymmetrical spacing of the first series of teeth, the second series of teeth and the third series of teeth allow a limited number of positions for the handle hub with respect to the shell hub.

5. The handle assembly of claim 4, wherein handle hub further comprises an arm extending radially away from the outer perimeter, and wherein the limited number of positions for the handle hub with respect to the shell hub correspond to a carrying position with the arm extending generally vertically, a stroller position with the arm angled in a first direction away from vertical, and a car seat position with the arm angled in a second direction away from vertical, the first direction opposite the second direction.

6. The handle assembly of claim 5, further comprising:
a sleeve coupled to the arm of the handle hub;
a handle extension, having a top portion, the handle extension slidably coupled to the sleeve, the handle extension movable between a retracted position and an extended position, wherein, in the extended position, the top is farther from the handle hub than in the retracted position;
a locking mechanism having a movable tab selectively coupling the sleeve to the handle extension in both the retracted position and the extended position; and
a release button movably held within the handle extension top portion, the release button operably coupled to the locking mechanism to selectively move the tab to uncouple the sleeve from the handle extension and allow the handle extension to move with respect to the sleeve.

7. The handle assembly of claim 6, further comprising a finger movably held within the sleeve, the finger having a first position where the finger is engaged with the tab, preventing movement of the tab to maintain the coupling of the sleeve and the handle extension, and the finger having a second position where the finger is disengaged from the tab, allowing movement of the tab by the release button to disengage the finger from the tab and allowing the handle extension to move with respect to the sleeve.

8. The handle assembly of claim 7, wherein the shell hub includes an outer shelf preventing the finger from disengaging from the tab, the shelf having a relief portion aligned with the handle arm when the arm is in the stroller position, and wherein the relief area allows the finger to disengage with the tab only in the stroller position.

9. The handle assembly of claim 8, further comprising a spring-biased block held within the handle hub, the block having a first position allowing the release disk to move to the release position, and a second position preventing the release disk from moving to the release position, and wherein the handle extension abuts the block to overcome the spring-bias and maintain the block in the first position when the handle extension is in the retracted position, and wherein the spring-bias moves the block to the second position when the handle extension is in the extended position, such that the handle hub can only be rotated with the handle extension in the retracted position.

10. A convertible infant carrier and stroller assembly comprising:
a shell having a head end, a toe end, and spaced apart sides extending from the head end to the toe end;
a pair of shell hubs, one on each side of the shell, each shell hub having an outer perimeter and a first series of teeth spaced adjacent the outer perimeter;
a pair of handle hubs, one in axial alignment with a corresponding shell hub, each handle hub having a second series of teeth spaced adjacent an inner perimeter of each handle hub;
a pair of sprockets, one in axial alignment with a corresponding shell hub and handle hub, each sprocket being located between a corresponding shell hub and handle hub, each sprocket having a third series of teeth spaced about an outer perimeter of the sprocket;
wherein each sprocket is axially movable from a first position locking the corresponding shell hub and the handle hub, and a second position unlocking the corresponding handle hub and shell hub, and wherein in the second position, each handle hub is rotatable with respect to the corresponding shell hub;
the assembly further comprising a biasing means for biasing the sprocket towards the first position; and
a pair of release disks, each of the pair of release disks in axial alignment with one of the shell hubs, the handle hubs and the sprockets, and wherein each release disk is axially movable with respect to the corresponding handle hub, each release disk movable between a lock position where the release disk is disengaged from the sprocket with the sprocket in the first position and a release position where the release disk engages the sprocket with the sprocket in the second position, each release disk overcoming the corresponding spring force in the release position.

11. The assembly of claim 10, wherein the first series of teeth, the second series of teeth and the third series of teeth are asymmetrically spaced, and allow only three positions of each handle hub with respect to the corresponding shell hub.

12. The assembly of claim 11, wherein handle hub further comprises an arm extending radially away from the outer perimeter, and wherein the positions for the handle hub with respect to the shell hub correspond to a carrying position with the arm extending generally vertically, a stroller position with the arm angled in a first direction away from vertical, and a car seat position with the arm angled in a second direction away from vertical, the first direction opposite the second direction.

13. The assembly of claim 12, further comprising:
a sleeve coupled to each arm of each handle hub;
a handle extension, having a top portion, the handle extension slidably coupled to each sleeve with the top portion extending from one side of the shell to the opposite side, the handle extension movable between a retracted position and an extended position, wherein, in the extended position, the top is farther from the handle hub than in the retracted position;
a locking mechanism having a pair of movable tabs, each tab selectively coupling one of the sleeves to the handle extension in both the retracted position and the extended position; and
a release button movably held within the handle extension top portion, the release button operably coupled to the locking mechanism to selectively move the tabs to uncouple the sleeves from the handle extension and allow the handle extension to move with respect to the sleeve.

14. The assembly of claim 13, further comprising a means for selectively allowing the movement of the tabs only when the handle hub is in the stroller position.

15. The assembly of claim 14, further comprising a means for preventing the release disks from moving to the release position when the handle extension is in the extended position.

16. The assembly of claim 15, wherein each release disk has a plurality of spaced fingers that releasably engage a corresponding sprocket.

* * * * *